Dec. 18, 1923.

J. E. HENNESSY ET AL 1,478,224

FRUIT JUICE MACHINE

Filed Jan. 11, 1923   3 Sheets-Sheet 1

INVENTORS
Carl F. Blattner and
James E. Hennessy
BY
ATTORNEYS.

Dec. 18, 1923.

J. E. HENNESSY ET AL 1,478,224

FRUIT JUICE MACHINE

Filed Jan. 11, 1923

3 Sheets-Sheet 2

INVENTOR.
Carl F. Blattner and
James E. Hennessy,
BY Arthur L. Mack
ATTORNEYS.

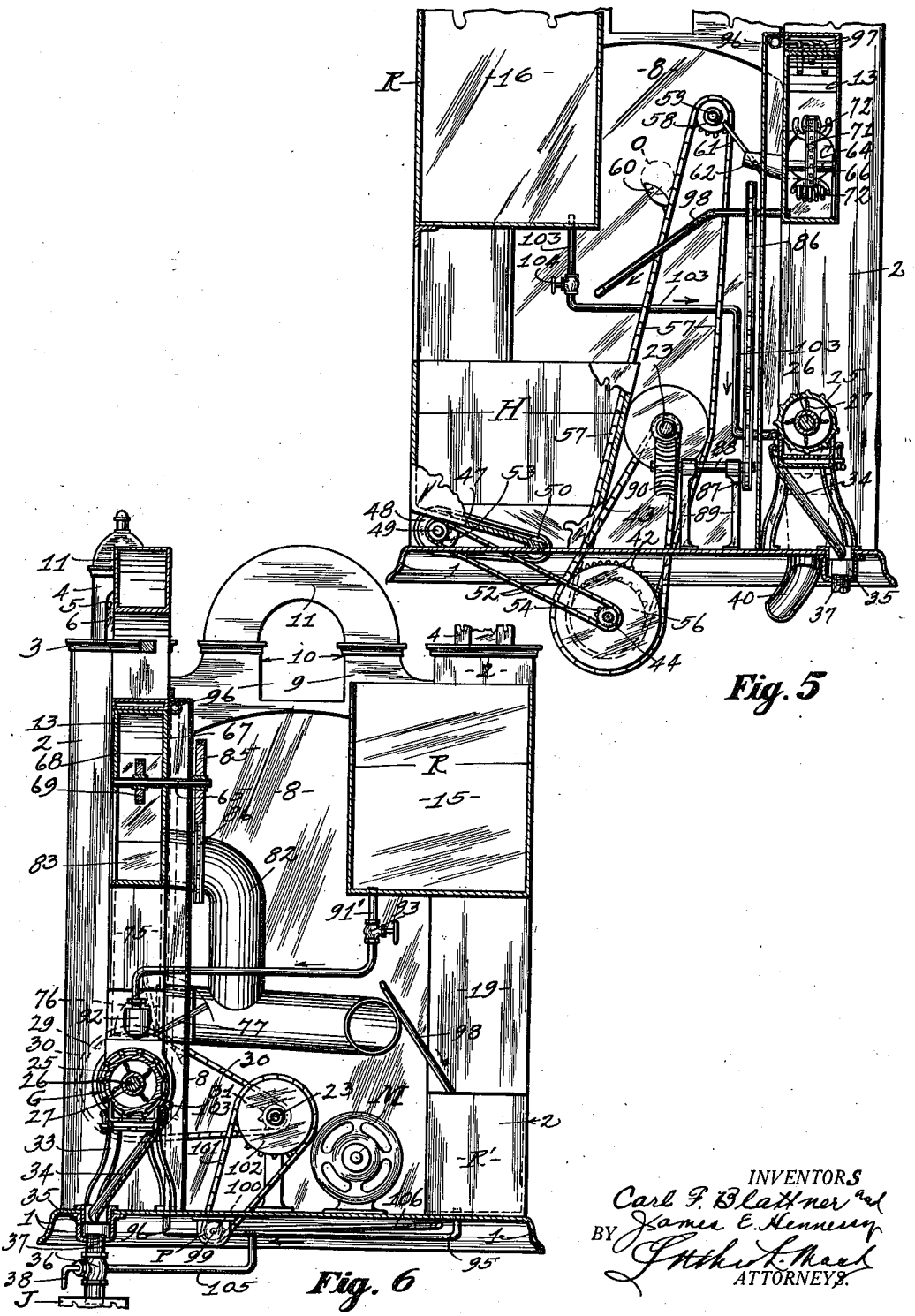

Patented Dec. 18, 1923.

1,478,224

UNITED STATES PATENT OFFICE.

JAMES E. HENNESSY, OF LOS ANGELES, AND CARL F. BLATTNER, OF LONG BEACH, CALIFORNIA.

FRUIT-JUICE MACHINE.

Application filed January 11, 1923. Serial No. 612,102.

*To all whom it may concern:*

Be it known that we, JAMES E. HENNESSY and CARL F. BLATTNER, citizens of the United States, and residents, respectively, of Los Angeles, in the county of Los Angeles, State of California, and Long Beach, in the county of Los Angeles, State of California, have invented new and useful Improvements in Fruit-Juice Machines, of which the following is a specification.

This invention relates to fruit juice machines, and the main object is to provide a machine for grinding or crushing the fruit and for extracting the juices therefrom and for discharging and collecting the juices and the pulp in separate receptacles.

Another object is to provide a fruit juice machine having means for grinding or crushing the fruit for extracting the juices and for mixing syrup therewith in order to sweeten the juices to the taste, and means for thoroughly cleansing the fruit prior to the extraction of the juice therefrom, and means whereby the fruit is visible during its movement through the machine in so far as possible so as to provide a machine which will attract trade and will provide an ornamental appearance.

A still further object is to provide in addition to the objects hereinabove mentioned, means whereby liquid of the same color as the fruit juices may be visibly circulated through the several elements of the machine when the machine is not operating for extracting the juices and for maintaining a constant movement of the fruit through the machine so as to afford a true representation of the operation of the machine when it is unnecessary to operate the same for extracting the juices.

A further object is to provide in a fruit juice machine means for cleansing the fruit preparatory to the crushing operation, means for thoroughly cleansing the fruit by spraying with water while the fruit is in motion, means for feeding a syrup to the crushing means for mixture with the juices extracted from the fruit, and means for imitating a fruit crushing operation without actually extracting the juices therefrom.

Still other objects will be explained in detail as the description of our invention progresses.

Figures 1, 2:
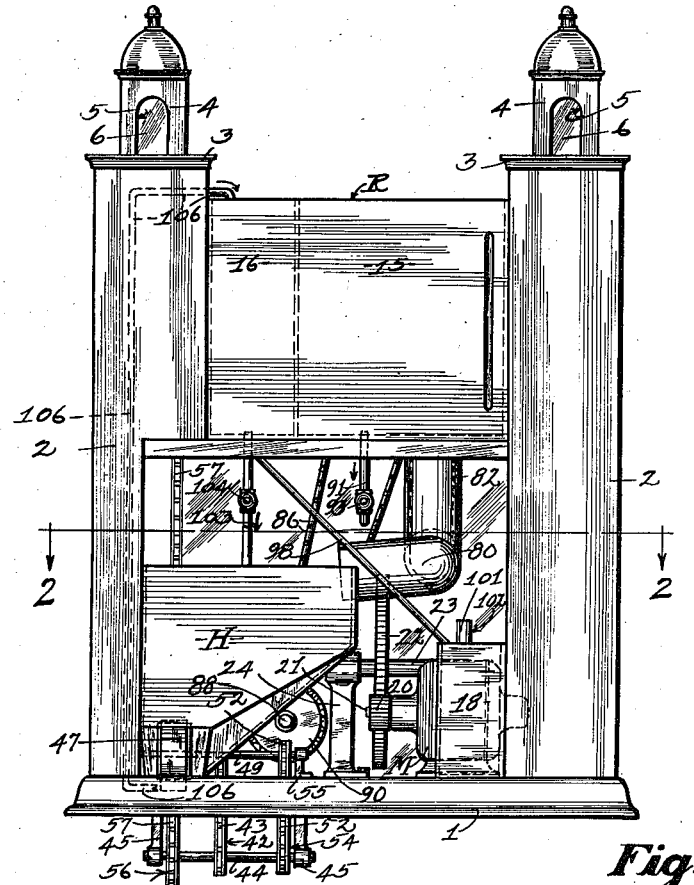
Figure 3:
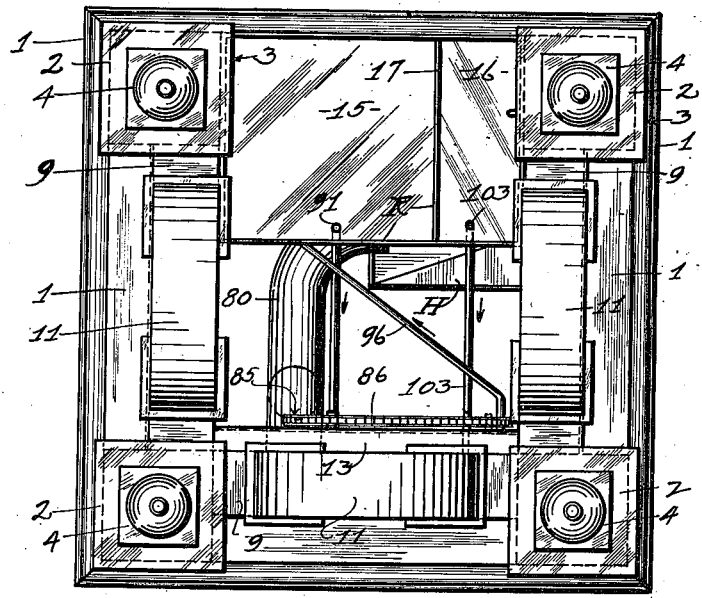
Figure 4:
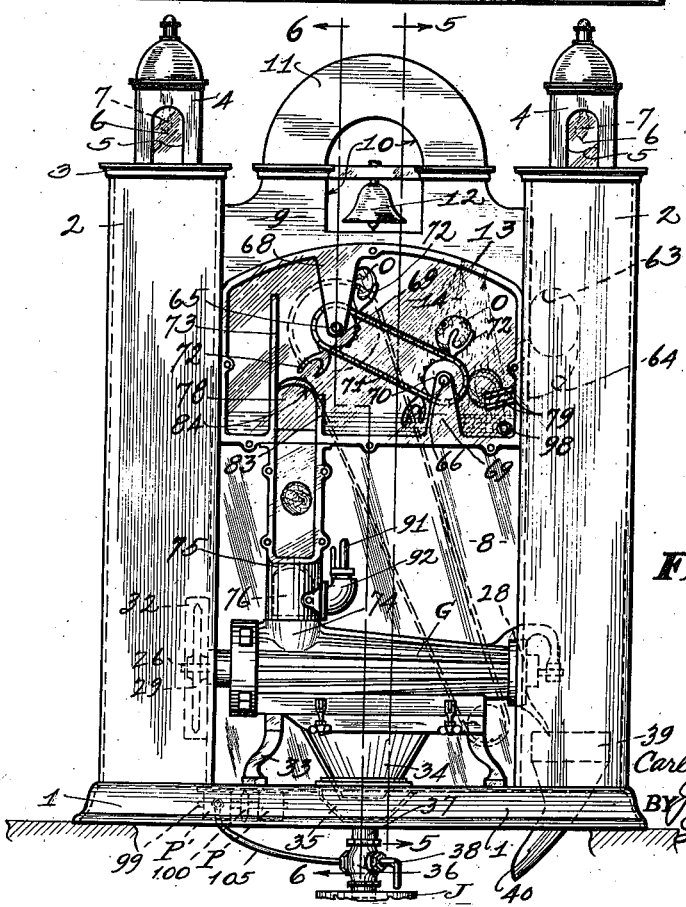

We have illustrated one practical embodiment of our invention, subject to modification within the scope of the appended claims, in the accompanying drawings, in which:

Fig. 1 is a rear elevation of our assembled machine.
Fig. 2 is a sectional plan of the same on line 2—2 of Fig. 1.
Fig. 3 is a top plan of the machine.
Fig. 4 is a front elevation thereof.
Fig. 5 is a sectional elevation on line 5—5 of Fig. 4, partly broken away.
Fig. 6 is a sectional elevation on line 6—6 of Fig. 4.

Now, as shown in said drawings in a preferred form, and arranged for extracting the juices from fruit for providing beverages, our machine embodies an ornamental frame in which all of the operating elements are mounted, including a cast metal base 1 of rectangular form and substantially shallow depth, on which is mounted at the four corners thereof a set of hollow columns 2, 2, etc., of square or rectangular cross section, although the form of said columns and base is immaterial to our invention. The tops of said columns are provided with suitable mouldings 3, 3, etc., and also have reduced tower like extensions 4, 4, etc., which lend sightliness and ornamentality to the columns.

The top portions 4, 4, of said columns are also hollow and have openings 5, 5, etc., in the side thereof which are covered by panels 6, 6, etc., and if desirable, electric lamps as at 7, 7, etc., as shown in Fig. 4, may be suspended within the portions 4 of the columns so as to light the interior thereof and be visible through the glass panels 6.

The front and two sides of the frame are provided with partitions 8, 8, etc., which span the spaces between the columns 2, 2, and above said partitions the upper ends of the columns 2 are connected by means of beams 9, 9, etc., with openings 10, 10, etc., formed centrally therein and covered by semi-circular arches 11, 11, etc. For purposes hereinafter described, however, it will be observed that in the rear side of the frame the partitions 8, the beams 9, and the arches 11 are omitted.

In the openings 10 of the beams 9 and arches 11, we may provide miniature mission bells as at 12, which lend distinctiveness to the frame and provides a design following closely after the mission type of architecture.

Thus, it will be observed that the frame is entirely closed at the front and two sides thereof for the purpose of enclosing all of the operating mechanism, while the front of the frame between the columns 2, 2, is provided substantially above the base 1 with a cast metal receptacle 13 adapted to be suitably attached to the columns 2, 2, and closed by means of a glass panel 14 suitably held on the front side thereof.

The partition 8 in the front of the frame is positioned substantially rearwardly of the rear sides of the front columns 2, 2, so as to leave a space in front of the partition sufficient to accommodate a suitable grinder G between the columns 2, 2, for crushing the fruit and extracting the juice therefrom. In the rear side of the machine between the columns 2, 2, and near the top of the frame, we provide a sheet metal receptacle R having a compartment 15 therein for holding a quantity of syrup, and a smaller compartment 16 separated therefrom by means of a partition 17 for holding a quantity of colored water or liquid, for purposes hereinafter described.

Below the receptacle R and on the floor of the base 1 and adjacent one of the columns 2, we provide a sheet metal receptacle R' having a compartment 18 therein for holding a quantity of clear water for purposes hereinafter described, thus providing a space 19 at the rear of the machine between the receptacles R and R' for affording access to the operating mechanism. Also, at the rear of the machine we provide a substantially large hopper H mounted on the base 1 at the other side of the machine from the receptacle R' for receiving and holding a quantity of fruit preparatory to a juice extracting operation.

Now, on the base 1 between the columns 2, 2, etc., we provide a motor M which has a pinion 20 on the shaft 21 thereof adapted to mesh with and drive a relatively large spur gear 22 carried on a main shaft 23, which is held in bearings 24, 24, in the opposite ends thereof, and a similar bearing intermediate its ends extends transversely across the frame of the machine.

The grinder G is similar to grinders now in vogue for other purposes and embodies a stationary cylinder 25 with a longitudinal shaft 26 therein, a screw conveyer 27 attached to said shaft, and a grinding head 28 on one end thereof. The shaft 26 of the grinder carries on its opposite end from the head 28 a sprocket 29, which is connected by means of a chain 30 with a smaller sprocket 31 held on the main shaft 23, thus operatively connecting the grinder G with the motor M at a proper speed ratio, and it will be observed that the sprocket 29 is housed within one of the columns 2 and the chain 30 connected therewith operates through an opening 32 in said column, as shown in Fig. 4.

The grinder G has a suitable stand or supporting frame 33 which is mounted on and attached to the upper side of base 1 and the juices from the grinder are adapted to be discharged through a funnel shaped outlet 34 which extends downwardly into a conically formed receptacle 35 carried in the upper side of base 1, and to which receptacle a three-way cock 36 is attached at the point 37, so that the juices may be discharged through the outlet 34, receptacle 35, and cock 36 into a suitable receptacle J for holding the extracted juices when the valve 38 of the cock is turned so as to permit. The pulp is discharged through the head 38 of the grinder into a hopper or funnel 39 carried at one side of the base and having a spout 40 which may convey the pulp into any suitable receptacle held below the base 1, as shown in Fig. 4.

The main shaft 23 carries a sprocket 41 near one end thereof, as shown in Fig. 2, which is operatively connected with a somewhat larger sprocket 42 by means of a chain 43, and the sprocket 42 is fixed to a countershaft 44 below the base 1 and rotatably held thereon in spaced bearings 45, 45, as shown in Figs. 1 and 5.

The hopper H in the rear of the frame is inclined downwardly from its innermost side outwardly of the frame, and is provided in the bottom with an opening 46 in which a belt 47 is adapted to operate for agitating and moving the fruit held in the hopper H forwardly of the machine. Said belt is inclined forwardly of the machine and operates over a large pulley 48 near the rear side of the machine, carried on a transverse shaft 49, and a smaller pulley 50 carried on a short transverse shaft 51.

Motion is communicated to the belt 47 by means of a sprocket chain 52 which operatively connects shaft 49 by means of a sprocket 53 thereon with shaft 44 by means of a sprocket 54 on said latter shaft. The shafts 49 and 51 may be journaled in suitable bearings on the top of the frame 1, as shown at 55 in Fig. 1.

Now, shaft 44 carries a sprocket 56 which is connected by means of a chain 57 with a sprocket 58 on a transverse shaft 59 near the top of the frame and in the rear of the receptacle 13, the shaft 59 being suitably journaled at the sides of the frame and transversely disposed thereacross, as shown in Fig. 5. The chain 57 serves as an elevator for conveying the fruit such as oranges or apples or the like from the hopper H to the receptacle 13, and to this end is provided with one or more concave carriers 60 which move beneath the oranges as at O, which are held in hopper H and grip and hold the same during the forward movement of the chain over and around the shaft 59, and by means of which they are deposited on a pair or more of inclined rods 61 which serve to deliver the fruit into a chute 62 on the adjacent side of one of the columns 2, there being an opening 63 in the wall of said column through which the oranges or fruit may pass, and thereafter the pieces of fruit are moved by gravity through a passage in the column 2 and outwardly therefrom through an opening 64 in the adjacent side of the column which opens into one end of the receptacle 13.

Now, the receptacle 13 has a pair of parallel shafts 65 and 66 mounted in spaced relation, and one at a greater elevation than the other. Said shafts are journaled in the rear side 67 of receptacle 13 and also on the front side thereof the bearings 68 and 69 respectively, which are formed integral with the receptacle. Shaft 65 carries a sprocket 69 which is operatively connected with a sprocket 70 on shaft 66 by means of a chain 71, and said chain has a plurality of curved forked carriers 72, 72, etc., which, when the chain moves by the outlet 64 will grip and elevate the oranges or fruit O and move them with the belt to a point over an outlet 78 in the bottom of the receptacle 13.

It will be noted that the opening 64 has a plurality of spaced rods 79 inclined downwardly therefrom, and the fingers of the carrier members 77 on chain 71 are staggered with relation to said rods, so that when the oranges roll downwardly over the inclined rod 79 the carrier 72 will grip and hold the oranges thereon and convey the same to a point above the outlet 78. Said outlet 78 has a substantially elevated guide member 73 which will ordinarily prevent the oranges from failing to enter the opening 78.

The grinder G has an inlet 74 for the oranges which is connected by means of a tube or pipe 75 with the outlet 78 of receptacle 13, and a greater portion of said tube is adapted to be covered by a transparent element such as glass or the like so as to render the movement of the oranges therethrough visible, as shown in Fig. 4. The lower portion of the tube 75 is provided with a butterfly gate 76 in the bottom thereof, above the inlet 74 of the grinder, which is adapted to be operated by means of a lever 77 for closing the inlet 74, as indicated in Fig. 6. The tube 75 is preferably of square cross section, as shown in Fig. 2. and is also connected near its bottom, and above inlet 74 with hopper H by means of a slightly inclined pipe 80, the front end of which is also adapted to be closed by the gate 76 when the inlet 74 is open, and the outer curved end 81, of which is adapted to overlie the hopper H for conveying the oranges into the hopper when the gate 76 is positioned for closing the inlet 74.

Receptacle 13 also has an opening in the bottom and rear side thereof which is connected with the pipe 80 by means of an upwardly extending and curved section of pipe 82 for the purpose of diverting the oranges for passage therethrough instead of through the feed pipe 75 to the grinder. In this connection it will be noted that a transverse channel is provided across the bottom of receptacle 13 between the high partition 73 and a lower partition 83 in said receptacle, and on the rear side 67 of said receptacle an opening 84 is provided at the end of said channel whereby any surplus oranges during the operation of the grinder may be diverted through the pipes 82 and 80 back to the hopper H. When, however, the gate 76 is closed over the inlet 74 when the grinder is out of use, the oranges may be diverted through the pipe 80 to the hopper or through both pipes 80 and 82.

The height of the partition 83 in the receptacle 13 is sufficient to accommodate a quantity of liquid in the bottom of said receptacle, which may accumulate from a cleaning mechanism to be hereinafter described, and so that the outlet 84 in the rear of the receptacle will be closed against the discharge of the liquid therethrough.

The rear end of shaft 65 carries a sprocket 85 which is connected by means of a chain 86 with a sprocket 87 on a counter-shaft 88 journaled in bearings 89, 89, substantially above the level of base 1. The shaft 88 also carries a worm gear 90 on one end thereof which meshes with and is adapted to be driven by a worm 91 carried on the main shaft 23.

Thus, from the mechanism just described it will be observed that the oranges which are manually supplied to the hopper H will feed inwardly of the hopper by means of the belt 47 to and are then elevated by means of chain 57 to the receptacle 13, thereafter the oranges are moved by means of the chain 71 through the receptacle 13, pipe 75 to the grinder G when the machine is operating, or are otherwise diverted through the pipe 80 back to the hopper. The latter portion of the movement of the fruit is visible at all times by means of the glass panel in front of the receptacle 13 and also on the pipe 75.

During a grinding operation when the fruit is conveyed to and crushed in the grinder G for extracting the juice therefrom, syrup for the purpose of sweetening the juice and rendering the same palatable is contained in the compartment 15 of the receptacle R in the rear of the frame, and is delivered therefrom continuously to the grinder by means of a pipe 91' which leads to and is connected with an inlet 92 in the lower portion of pipe 75. Pipe 91 is preferably provided with a suitable stop cock or valve 93 by means of which the supply of syrup to the grinder may be regulated or completely shut off.

On the lower side of the bed plate 1, we provide a pair of pumps as at P and P′ which are adapted for connection respectively with the clear water tank R′ and the colored water compartment 16 of receptacle R. Pump P is connected with the tank R′ by means of a pipe 95 disposed below the base 1, and the outlet of said pump is connected by means of a pipe 96 which extends upwardly with the interior of receptacle 13 by means of a plurality of smaller tubes 97, 97, etc., as shown in Fig. 5, and the discharge ends of said small tubes are extended downwardly through the arched top of the receptacle 13 and above a conveyer chain 71, so that as the oranges or other fruit are moved by means of the conveyer 71 through the receptacle 13, they will be sprayed and cleaned, and the water which is thus admitted to the receptacle 13 collects in the bottom thereof, but never attains a height equal to the height of the partition 83 and is drained from the receptacle by means of a drain pipe 98 back to the clear water receptacle R′.

The pumps P and P′ as shown, are rotary pumps and the transversely disposed shaft 99 of said pumps has a sprocket 100 thereon which is connected by means of a chain 101 with a larger sprocket 102 carried on the main shaft 23. The compartment 16 of tank R which is adapted to hold a supply of water or liquid colored corresponding to the color of the fruit juice, has a discharge pipe 103 connected at the bottom thereof with a valve 104 interposed therein, and said pipe leads to and has its outlet end disposed above the funnel 34 of the grinder G, so that the imitation juice of the compartment 16 will be delivered to said funnel and from thence will flow to the stop cock 36. This supply of imitation liquid, however, is used only when the machine is not in operation, and in such case the valve 38 of the cock 36 will be closed against the discharge of the colored liquid into the receptacle J, and the supply of the liquid will be delivered through a pipe 105 to the pump P′, from whence it will be returned through a pipe 106 to the top of the compartment 16. The pumps P and P′ thus serve to continuously circulate the cleansing water from the tank 18 and the colored water from the tank 16 through the pumps, and the connections described, when the machine is not performing a juice extracting operation.

It will be understood in this connection with the description of my invention, in machines of this character where it is desirable to prepare the juices as the same are required for use and sale, in order to prevent fermentation and spoiling thereof, and to this end our machine is arranged so that all of the elements necessary for a fruit juice extracting operation may be operated together within the plain view of the purchaser so as to indicate that the beverages thus made are fresh and pure, but, on the other hand when at times the sale of the juice is not large, it is desirable to attract the attention of the purchasers by the operation of the machine, and when an ample supply of the fruit juices is on hand, the grinding mechanism, while operatively connected with the machine, may be disconnected from a supply of syrup and fruit, but the fruit will be moved the same as in a grinding operation, and the colored imitation of the juice may be supplied by means of the pump P′ and the operation of the valve 38 of stop cock 36, so as to circulate continuously and give the impression of an actual operation of the machine.

As arranged and shown in the drawings our machine obscures but very little of the operation of the machine, and the entire arrangement is sightly and ornamental and is adapted for attracting trade and provides a thoroughly sanitary and highly satisfactory means of dispensing fruit beverages.

What we claim is:

1. A fruit juice machine including a base, a hopper for the fruit mounted thereon, a cleaner above the level of said hopper, means for elevating the fruit from said hopper to said cleaner, a grinder supported on said base below and connected with said cleaner, and means for moving the fruit through said cleaner and discharging the same into said grinder.

2. A fruit juice machine including a base, a hopper for the fruit mounted thereon, a cleaner above the level of said hopper, means for elevating the fruit from said hopper to said cleaner, a grinder supported on said base below and connected with said cleaner, means for moving the fruit through said cleaner and discharging the same into said grinder, and separate means for discharging the pulp and the juice from said grinder.

3. A fruit juice machine including a base, a hopper for the fruit mounted thereon, a cleaner above the level of said hopper, means for elevating the fruit from said hopper to said cleaner, a grinder supported on said base below and connected with said cleaner, means for moving the fruit through said cleaner and discharging the same into said grinder, and means interposed between said grinder and said cleaner for diverting the fruit back to said hopper at will.

4. A fruit juice machine including a base, a hopper for the fruit mounted thereon, a cleaner above the level of said hopper, means for elevating the fruit from said hopper to said cleaner, a grinder supported on said base below and connected with said cleaner, means for moving the fruit through said cleaner and discharging the same into said grinder, separate means for discharging the pulp and the juice from said grinder, and means interposed between said grinder and said cleaner for diverting the fruit back to said hopper at will.

5. A fruit juice machine including a base, a hopper for the fruit mounted thereon, a cleaner above the level of said hopper, means for elevating the fruit from said hopper to said cleaner, a grinder supported on said base below and connected with said cleaner, means for moving the fruit through said cleaner and discharging the same into said grinder, and means connected with said cleaner for diverting the surplus fruit back to said hopper.

6. A fruit juice machine including a base, a hopper for the fruit mounted thereon, a cleaner above the level of said hopper, means for elevating the fruit from said hopper to said cleaner, a grinder supported on said base below and connected with said cleaner, means for moving the fruit through said cleaner and discharging the same into said grinder, separate means for discharging the pulp and the juice from said grinder, and means connected with said cleaner for diverting the surplus fruit back to said hopper.

7. A fruit juice machine embodying a base, a grinder mounted on said base, a cleaning receptacle spaced from said grinder, means for continuously moving the fruit to and through said cleaning receptacle to said grinder, and means connected with said receptacle whereby the surplus fruit will be diverted from the grinder.

8. A fruit juice machine embodying a base, a grinder mounted on said base, a cleaning receptacle spaced from said grinder, means for continuously moving the fruit to and through said cleaning receptacle to said grinder, means connected with said receptacle whereby the surplus fruit will be diverted from the grinder, and additional means interposed between said receptacle and said grinder for closing the grinder against the reception of the fruit, at will.

9. A fruit juice machine embodying a base, a grinder mounted on said base, a cleaning receptacle spaced from said grinder, means for continuously moving the fruit to and through said cleaning receptacle to said grinder, means connected with said receptacle whereby the surplus fruit will be diverted from the grinder, additional means interposed between said receptacle and said grinder for closing the grinder against the reception of the fruit, at will, and a hopper for holding a quantity of fruit for delivery to said receptacle.

10. A fruit juice machine embodying a base, a grinder on said base, a cleaning receptacle substantially elevated above said base, means for continuously moving fruit to said receptacle, a conveyer within said receptacle for moving the separate pieces of fruit beneath a liquid spray for cleaning the same, a tubular connection between said grinder and said receptacle, and means in said tubular connection for closing said grinder against the reception of said fruit and diverting the fruit to other points at will.

11. A fruit juice machine embodying a base, a grinder on said base, a cleaning receptacle substantially elevated above said base, means for continuously moving fruit to said receptacle, a conveyer within said receptacle for moving the separate pieces of fruit beneath a liquid spray for cleaning the same, a tubular connection between said grinder and said receptacle, means in said tubular connection for closing said grinder against the reception of said fruit and diverting the fruit to other points, at will, a tank for holding a quantity of syrup for mixture with the juice, and means for connecting said tank with the grinder.

12. A fruit juice machine embodying a grinder for extracting the juice from the fruit, a cleaner connected with said grinder, means therein for moving the fruit beneath a liquid spray for cleaning the same, and thereafter discharging the fruit into said grinder, and means for circulating water through said cleaner, as described.

13. A fruit juice machine embodying a grinder for extracting the juice from the fruit, a cleaner connected with said grinder, means therein for moving the fruit beneath a liquid spray for cleaning the same, and thereafter discharging the fruit into said grinder, and means for circulating water through said cleaner, said means embodying a tank for holding a quantity of water, and a pump for circulating the water between said tank and said cleaner.

14. A fruit juice machine including a base, a grinder mounted thereon having separate outlets for the pulp and the juice extracted from the fruit, means for continuously feeding fruit from a common point to the grinder, a tank for holding a quantity of syrup for mixture with the a quantity of syrup for mixture with the extracted juice and connected with the juice outlet of said grinder, and means for diverting the fruit from the grinder to the point of origin, at will.

15. A fruit juice machine including a base, a grinder mounted thereon and having an outlet for the extracted juice, a valve connected with said outlet, a tank for holding a quantity of imitation fruit juice, a pump connected with said valve and with said tank whereby said imitation juice may be circulated through said grinder and said tank continuously.

16. A fruit juice machine including a base, a grinder mounted thereon and having an outlet for the extracted juice, a valve connected with said outlet, a tank for holding a quantity of imitation fruit juice, a pump connected with said valve and with said tank whereby said imitation juice may be circulated through said grinder and said tank continuously, and means for moving fruit from a common point to said grinder in a continuous operation.

17. A fruit juice machine including a base, a grinder mounted thereon and having an outlet for the extracted juice, a valve connected with said outlet, a tank for holding a quantity of imitation fruit juice, a pump connected with said valve and said tank whereby said imitation juice may be circulated through said grinder and said tank continuously, means for moving fruit from a common point to said grinder in a continuous operation, and means for diverting the fruit from the grinder to the point of origin when said imitation juice is circulated through the grinder, said valve being operable for regulating the circulation of said imitation juice and for discharging the juice of the fruit to a suitable receptacle, at will.

18. A fruit juice machine embodying a grinder, a receptacle spaced from and connected with said grinder, a conveyer within said receptacle for moving the fruit therethrough and delivering the same to said grinder, and means for discharging a cleaning liquid against the fruit during the movement of the same in said receptacle.

19. A fruit juice machine embodying a grinder, a receptacle spaced from and connected with said grinder, a conveyer within said receptacle for moving the fruit therethrough and delivering the same to said grinder, and means for discharging a cleaning liquid against the fruit during the movement of the same in said receptacle, said receptacle having an outlet for the fruit elevated above the bottom of the receptacle whereby said receptacle may retain a quantity of the cleaning liquid during the operation thereof.

20. A fruit juice machine embodying a grinder, a receptacle spaced from and connected with said grinder, a conveyer within said receptacle for moving the fruit therethrough and delivering the same to said grinder, means for discharging a cleaning liquid against the fruit during the movement of the same in said receptacle, said receptacle having an outlet for the fruit elevated above the bottom of the receptacle whereby said receptacle may retain a quantity of the cleaning liquid during the operation thereof, and means in the side of said outlet for discharging the surplus fruit and diverting the same from the grinder.

21. A fruit juice machine embodying a grinder, a receptacle spaced from and connected with said grinder, a conveyer within said receptacle for moving the fruit therethrough and delivering the same to said grinder, means for discharging a cleaning liquid against the fruit during the movement of the same in said receptacle, said receptacle having an outlet for the fruit elevated above the bottom of the receptacle whereby said receptacle may retain a quantity of the cleaning liquid during the operation thereof, means in the side of said outlet for discharging the surplus fruit and diverting the same from the grinder, and means interposed between the grinder and said receptacle for diverting all of the fruit from the grinder, at will.

22. A fruit juice machine including a base, a grinder mounted thereon, a tank for holding a quantity of imitation fruit juice, means for holding a quantity of fruit, means for visibly moving the fruit to the grinder, an outlet to said grinder for the discharge of the juice, a valve connected with said outlet, a pump connected with said valve and with said tank, and means for diverting the fruit from the grinder to the point of origin whereby during the operation of the machine the fruit may be continuously moved in the direction of the grinder and said imitation juice circulated between said tank and said grinder for imitating a juice extracting operation.

23. A fruit juice machine embodying a grinder having separate outlets for the pulp and the extracted juice, a tubular feed pipe for directing the fruit to the grinder, means for successively feeding individual pieces of fruit to said pipe, a hopper for holding a quantity of the fruit, and means interposed in said pipe above the grinder for diverting the fruit from the grinder to said hopper, at will.

24. A fruit juice machine including a base, a hopper mounted thereon for holding a quantity of fruit, an inclined belt operably held in the bottom of said hopper, an elevator operating in said hopper for raising the fruit to feeding position, a cleaning receptacle for receiving the fruit from said elevator, an inclined conveyer within said cleaner for advancing the fruit during the cleaning operation, means for circulating a cleaning liquid through said cleaner, and a grinder for receiving the clean fruit and extracting the juice therefrom.

25. A fruit juice machine including a base, a hopper mounted thereon for holding a quantity of fruit, an inclined belt operably held in the bottom of said hopper, an elevator operating in said hopper for raising the fruit to feeding position, a cleaning receptacle for receiving the fruit from said elevator, an inclined conveyor within said cleaner for advancing the fruit during the cleaning operation, means for circulating a cleaning liquid through said cleaner, a grinder for receiving the clean fruit and extracting the juice therefrom, a pipe connecting said cleaner and said grinder, and means interposed therein for diverting the fruit from said grinder to said hopper, at will.

26. A fruit juice machine including a base, a hopper mounted thereon for holding a quantity of fruit, an elevator connected with said hopper for raising the fruit to feeding position, a cleaner for receiving the fruit from the elevator and cleaning the same, a grinder connected with said cleaner for extracting the juice from the fruit, a tank for holding a quantity of syrup for mixture with the juice of the fruit and connected with said grinder, and means interposed between said cleaner and said grinder for diverting the fruit from the grinder to said hopper, at will.

27. A fruit juice machine including a base, a hopper mounted thereon for holding a quantity of fruit, an elevator connected with said hopper for raising the fruit to feeding position, a cleaner for receiving the fruit from the elevator and cleaning the same, a grinder connected with said cleaner for extracting the juice from the fruit, a tank for holding a quantity of syrup for mixture with the juice of the fruit and connected with said grinder, means interposed between said cleaner and said grinder for diverting the fruit from the grinder to said hopper at will, a tank for holding a quantity of water, a pump connected with said tank and with said cleaner for circulating the water in the cleaning operation and cleaning the fruit.

28. A fruit juice machine including a base, a hopper mounted thereon for holding a quantity of fruit, an elevator connected with said hopper for raising the fruit to feeding position, a cleaner for receiving the fruit from the elevator and cleaning the same, a grinder connected with said cleaner for extracting the juice from the fruit, a tank for holding a quantity of syrup for mixture with the juice of the fruit and connected with said grinder, means interposed between said cleaner and said grinder for diverting the fruit from the grinder to said hopper at will, a tank for holding a quantity of water, a pump connected with said tank and with said cleaner for circulating the water in the cleaning operation and cleaning the fruit, a tank for holding a quantity of imitation fruit juice, a pump connected therewith and with said grinder for circulating said imitation juice at will through said grinder when the fruit is diverted therefrom.

29. A fruit juice machine including a base, a hopper mounted thereon for holding a quantity of fruit, an elevator connected with said hopper for raising the fruit to feeding position, a cleaner for receiving the fruit from the elevator and cleaning the same, a grinder connected with said cleaner for extracting the juice from the fruit, a tank for holding a quantity of syrup for mixture with the juice of the fruit and connected with said grinder, means interposed between said cleaner and said grinder for diverting the fruit from the grinder to said hopper at will, a tank for holding a quantity of water, a pump connected with said tank and with said cleaner for circulating the water in the cleaning operation and cleaning the fruit, a tank for holding a quantity of imitation fruit juice, a pump connected therewith and with said grinder for circulating said imitation juice at will through said grinder when the fruit is diverted therefrom, and means for regulating the circulation of said imitation juice, as described.

JAMES E. HENNESSY.
CARL F. BLATTNER.

Witnesses:
NADINE COLEMAN,
IRENE BREEN.